United States Patent [19]

Böhm

[11] 4,126,859
[45] Nov. 21, 1978

[54] GROUND STATION FOR A ROUND-TRIP-PATH DISTANCE-MEASURING SYSTEM

[75] Inventor: Manfred Böhm, Stuttgart, Germany

[73] Assignee: International Standard Electric Corporation, New York, N.Y.

[21] Appl. No.: 846,432

[22] Filed: Oct. 28, 1977

[51] Int. Cl.² .............................................. G01S 9/56
[52] U.S. Cl. .............................. 343/5 LS; 343/6 DF
[58] Field of Search ...................................... 343/5 LS

[56] References Cited
U.S. PATENT DOCUMENTS 3,564,543  2/1971  Nehama et al. ............... 343/5 LS X Primary Examiner—T.H. Tubbesing Attorney, Agent, or Firm—William T. O'Neil

[57] ABSTRACT

This DME ground station permits the distance from the touchdown point (where no transponder can be installed) to be measured on the aircraft without any change in the airborne equipment. The time difference between the reception of an interrogating signal and the transmission of a reply signal is chosen so that the transmission of reply signals from the DME transponder located on one side of the runway corresponds to a transmission from the touchdown point with respect to the signal transit time.

On the ground, a DME transponder is located on one side of the runway on a level with the touchdown point, and a receiver and a direction finder are provided on the other side.

5 Claims, 3 Drawing Figures

GROUND STATION FOR A ROUND-TRIP-PATH DISTANCE-MEASURING SYSTEM

BACKGROUND OF THE INVENTION

The present invention relates to a ground station for a round-trip-path distance-measuring system commonly known as a DME (distance-measuring equipment) system.

A DME ground station is known, for example from the text by E. Kramar, entitled "Funksysteme für Ortung und Navigation," published by Berliner Union GmbH, Stuttgart 1973, pp. 147 to 159.

Distance measurements are necessary both during en-route air navigation and during landing. For en-route navigation, the DME ground stations are colocated with a VOR ground station, for example. By measuring the angle to and the distance from this VOR/DME ground station, the pilot can determine his position relative to this station.

During the landing phase, the pilot needs the aircraft's distance from the touch-down point. That point is, however, along the runway centerline and accordingly no DME ground station can be installed there.

OBJECT

The general object of the invention is to provide a DME ground station which permits the aircraft's distance from the touch-down point to be accurately determined on the aircraft, without the need for location of the DME station on the actual runway.

ADVANTAGE

Through accurated calculation of the equivalent distance between the aircraft and the touch-down point, landing guidance is improved so that accuracy is sufficient for Catagory III landings.

BRIEF DESCRIPTION OF THE DRAWINGS

The invention will now be explained in more detail and by way of example with reference to the accompanying drawings, in which.

DETAILED DESCRIPTION

Figure 1A:
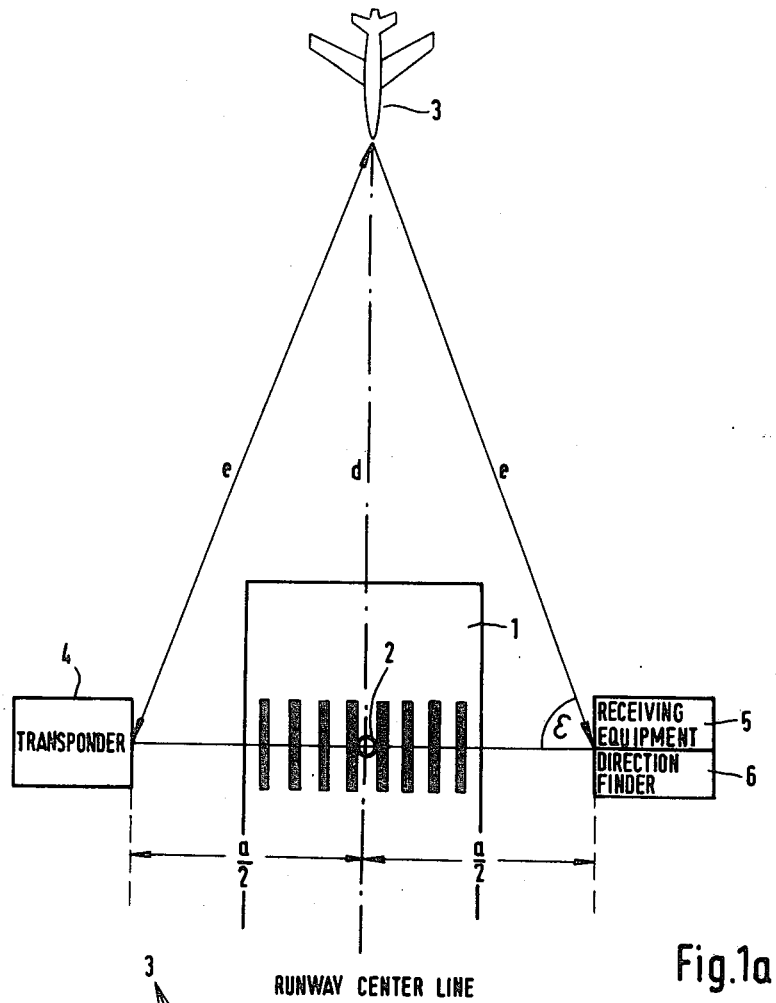
FIGS. 1a and 1b show the arrangement of the parts of the novel ground station on both sides of the runway, with an aircraft (a) on the localizer course, and (b) off to one side of the localizer course.

In FIG. 1a, the runway is designated by the reference numeral 1, and the touch-down point by 2. Located on the left-hand side of the runway is a transmitter-receiver 4 (DME transponder) which receives the DME interrogating signals (pairs of pulses) transmitted by the landing aircraft 3, and, after a fixed delay, retransmits DME reply signals (pairs of pulses). With the known DME transponders, this fixed delay is 50 $\mu$s. Located on the opposite side of the runway is a receiver 5 which likewise receives the DME interrogating signals. Also provided is a direction finder 6 which is colocated either with the DME transponder 4 or with the receiver 5 (as illustrated).

Figure 2:
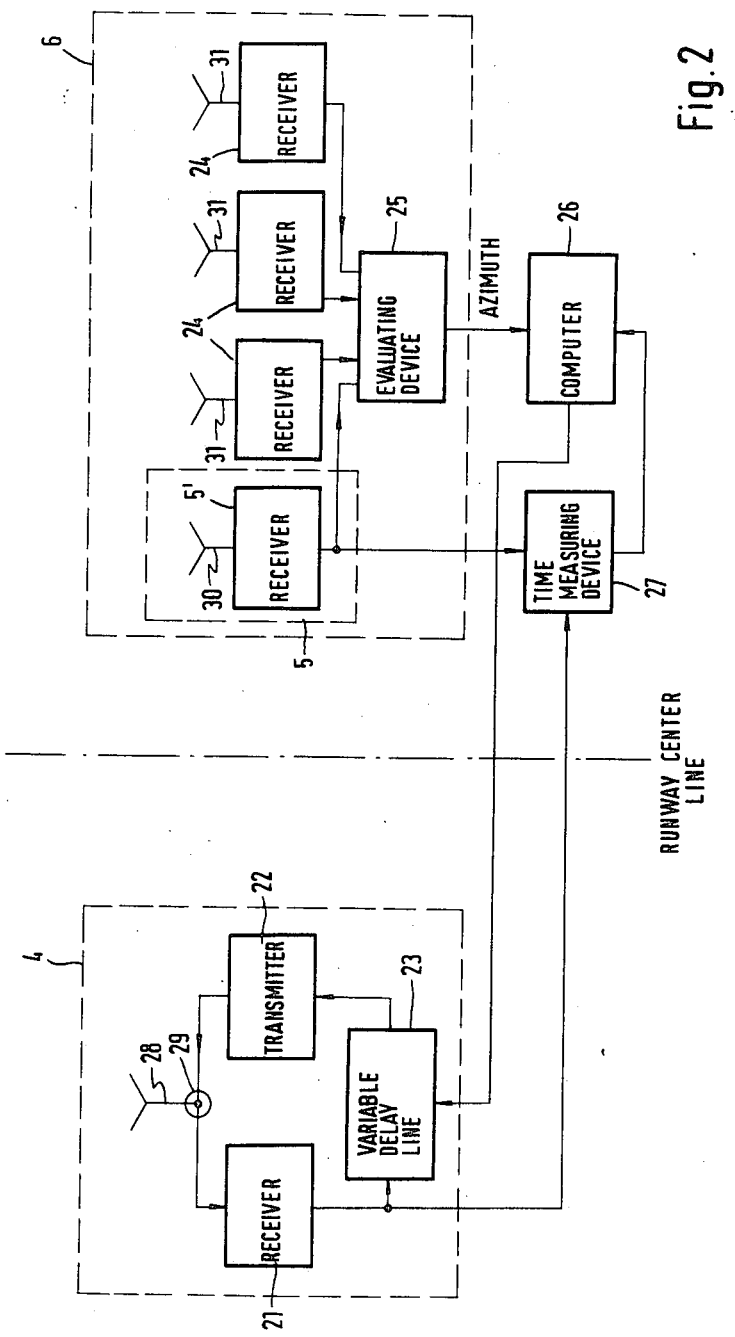
FIG. 2 is a block diagram of the ground station according to the invention.

The operation of the ground station will now be explained in more detail with the aid of FIG. 2.

The DME interrogating signals are received by an antenna 28 of the transponder 4 and fed to a receiver 21 through a circulator 29. The output signals of the receiver 21 control a transmitter 22 via a delay line 23. Thus the delay between the reception of the interrogating signal and the transmission of the reply signal is determined by the delay line 23.

The DME interrogating signal is also received by the antenna 30 of the receiving equipment 5 and is passed on to the receiver 5'. A time-measuring device 27 measures the difference between the time of arrival of the interrogating signal at the transponder 4 and the time of arrival at the receiver 5. The time-measuring device necessary for this purpose is known per se.

Figure 1B:
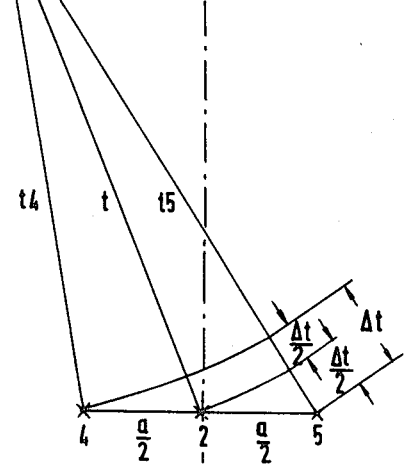

When measuring this time difference, it is important to determine not only the amount, but also the sign (sense). This will now be explained with the aid of FIG. 1b. If it is the transponder 4 which receives the interrogating signal first, namely after a transit time $t4$, then the aircraft 3 is to the left of the runway center line. The transit time to the receiving equipment 5 is $t5$; to the touch-down point it would be $t$. From the figure it can be seen that, compared to the transit time $t$ to the touch-down point 2, the transit time $t4$ is too short by $\Delta t/2$, so the distance measured aboard the aircraft will be too short by the distance corresponding to the time $\Delta t = 2\Delta t/2$ (round-trip path). $\Delta t$ is the measured difference $t5 - t4$ between the transit times $t5$ and $t4$.

This transit-time error is eliminated by transmitting the reply signal not 50 $\mu$s after the reception of the interrogating signal, but after 50 $\mu$s + $\Delta t$. The airborne receiver receives a reply signal which, with respect to the transit time, is seemingly radiated from the touch-down point. If the aircraft 3 is to the right of the runway center line, the delay time must be correspondingly reduced.

The variable delay line 23 may be controlled directly by the time-measuring device 27 or by a computer 26, which will be described below.

When the aircraft is on the extended runway center line, the transit times $t4$ and $t5$ are equal to one another. In this case, the delay between reception and transmission is 50 $\mu$s. Beyond a distance of about 1,000 m, suitably accurate measurements are thus obtained, since the error caused by the difference between the distances of the aircraft from the touch-down point and from the transponder is negligible.

At shorter ranges, however, this error greatly increases, so the correction so far described is no longer practical, and a different correcting method is therefore used for this case. This different correction, which is described below, takes effect regardless of the distance whenever the interrogating signals arrive at the transponder 4 and at the receiver 5 simultaneously, i.e., when the aircraft is on the extended center line. This condition is fulfilled for distances below 1,000 m.

For this correction of the distance value, the above-mentioned direction finder 6 determines the angle of arrival $\epsilon$ of the DME interrogating signals. From the angle of arrival $\epsilon$ and the distance $a/2$ of the direction finder 6 from the touch-down point 2, the distance $d(d = a/2 \tan \epsilon)$ of the aircraft from the touch-down point is calculated (FIG. 1). This distance could be transmitted to the airborne station, however, since the distance is to be measured on the aircraft by the normal DME-method, the aircraft-ground-aircraft round-trip time must - like in the first correcting method - be modified so as to correspond to the aircraft-touch-down point-aircraft distance. This requires that the distance $e$ between the aircraft and the direction finder be additionally known on the ground. This distance $e$ is $e = a/2 \sqrt{1 + \tan^2 \epsilon}$. From this it follows that the time the interrogating signal requires to travel from the airborne station to the transponder 4 is too long by $\Delta \tau = (e-d)/c = a/2c (\sqrt{1 + \tan^2 \epsilon} - \tan \epsilon)$. Thus the delay in the transponder 4 must be reduced by $2\Delta t$ (round-trip path). This correction is very precise for short distances, since, in this range, errors in the measurement of angles lead to only small metric errors. For the correction, only the angle $\epsilon$ needs to be measured, the distance $a$ and the velocity of light $c$ being known.

The above equation shows that the distance correction is proportional to $\tan \epsilon$. For $\epsilon \approx 90°$, this correcting value is approximately zero. For $\epsilon = 0°$, the correcting value is $a/2c$.

The correcting values for the transponder delay are computed from the angle $\epsilon$ in the computer 26. The computer can be programmed so as to change the delay only in given increments; for example, it does not begin with the correction until the angle $\epsilon$ is 80°, and computes a new correcting value only if the angular changes are at least 0.5°.

The direction finder 6 consists (FIG. 2) of four receivers (5' and 24) with one antenna (30 and 31) each, and of an evaluating device 25 following the receivers. The antennas may be arranged in a straight line perpendicular or parallel to the runway center line. The receiving equipment 5 may be incorporated in the direction finder. The direction finder 6 and its operation will not be explained here, because a monopulse direction finder as known from the DLS (DLS = DME-Based Landing System, described in an article by M. Böhm and G. Peuker, "DLS - ein neues Anflug- und Landesystem", Elektrisches Nachrichtenwesen, Vol. 50 No. 1, 1975, pp. 37 to 43) can be used, for example.

With the ground station described, the distance from the touch down point can be measured very precisely throughout the approach phase. In the case of long distances (where the relative error of the transit-time measurements is very small), the distance is corrected by values derived from the time-difference measurement. In the case of short distances (where the relative error of the angle measurement is very small), the distance is corrected by values derived from the angle measurement.

Errors resulting from the aircraft not being in the plane of the runway during the measurements are on the order of 1% and, therefore, are negligible.

What is claimed is:

1. A ground DME transponder station located to facilitate air-derived determination of distance to a runway touch-down point at a predetermined location along a runway centerline, comprising:

a first ground station subassembly comprising an antenna, a first DME receiver, a transmitter and a duplexer connecting said receiver and transmitter to said antenna for alternate reception and transmission, said first subassembly being located laterally with respect to said runway at a point spaced by a predetermined distance from said touchdown point;

controllable delay means within said first ground subassembly responsive to an externally supplied transmitter delay control signal, said delay means being connected from said first DME receiver to said transmitter to control the time of transmitter reply after reception of an interrogation signal by said receiver;

a second ground station subassembly comprising a second DME receiver and a colocated direction finder, said direction finder being responsive to said interrogation signal for generating a signal representative of the direction of arrival $\epsilon$ of said interrogation signal, said second subassembly being located laterally of said runway on the side opposite said first subassembly and spaced from said runway centerline by a second predetermined distance from said runway centerline;

and compensation means responsive to said first and second DME receivers and to said signal representative of the direction of arrival of said interrogation signal for controlling the delay provided by said controllable delay means such that said transmitter reply is received at the point of said air-derived determination substantially at the same time as if transmitted from said touchdown point.

2. Apparatus according to claim 1 in which said first and second predetermined distances, each $a/2$ where $a$ is the total distance between said first and second ground stations, from said runway centerline are substantially equal.

3. Apparatus according to claim 2 in which said touchdown point and said first and second ground station subassemblies lie on a straight line normal to said runway centerline.

4. Apparatus according to claim 3 in which said compensation means includes time-measuring means for determining the time shift $\Delta t$ of the interrogating signal received by said first DME compared to that received by said second DME receiver as a first correction and computer means responsive to the output of said direction finder and said time-measuring means to solve the equation $\Delta d = a/2 \sqrt{1 + \tan^2 \epsilon} - \tan \epsilon$ as a second correction, where $\Delta d$ is the incremental range difference between the slant range from said point of air-derived distance determination to one of said ground station subassemblies and the range to touchdown along said runway centerline, and said compensation means applying said first correction signal to set the delay of said controllable delay means whenever the said interrogation signal arrives at a different time at said second versus said first ground station subassembly, and applying said second correction signal whenever said interrogation signal arrives substantially contemporaneously at said first and second ground station subassemblies, corresponding to location of said point of air-derived distance determination located on a line in a vertical plane also containing said runway centerline.

5. Apparatus according to claim 2 in which said compensation means includes time-measuring means for determining the time shift $\Delta t$ of the interrogating signal received by said first DME receiver compared to that received by said second DME receiver as a first correction and computer means responsive to the output of said direction finder and said time-measuring means to solve the equation $\Delta d = a/2 \sqrt{1 + \tan^2 \epsilon} - \tan \epsilon$ as a second correction, where $\Delta d$ is the incremental range difference between the slant range from said point of air-derived distance determination to one of said ground station subassemblies and the range to touchdown along said runway centerline, and said compensation means applying said first correction signal to set the delay of said controllable delay means whenever the said interrogation signal arrives at a different time at said second versus said first ground station subassembly, and applying said second correction signal whenever said interrogation signal arrives substantially contemporaneously at said first and second ground station subassemblies, corresponding to location of said point of air-derived distance determination located on a line in a vertical plane also containing said runway centerline.

* * * * *